United States Patent

Ward

Patent Number: 5,558,030
Date of Patent: Sep. 24, 1996

[54] PLANT FEEDER APPARATUS

[76] Inventor: L. H. Ward, 6103 Indian Springs, Livingston, Tex. 77351

[21] Appl. No.: 272,814

[22] Filed: Jul. 11, 1994

[51] Int. Cl.⁶ .................................................. A01C 23/00
[52] U.S. Cl. .............................. 111/7.2; 47/48.5; 239/36; 239/37; 239/54
[58] Field of Search .................. 111/7.2, 7.1; 47/48.5 G, 47/48.5 R; 239/37, 36, 53, 54

[56] References Cited

U.S. PATENT DOCUMENTS

| | | | |
|---|---|---|---|
| 612,745 | 10/1898 | Morris | 111/7.2 |
| 1,512,758 | 10/1924 | Gravatt | 111/7.2 |
| 2,055,266 | 9/1936 | Thomas | 111/7.2 |
| 2,335,182 | 11/1943 | Hill | 111/7.2 |
| 2,867,943 | 1/1959 | Whitesell | 111/7.2 X |
| 2,885,977 | 5/1959 | Fabus | 47/48.5 G X |
| 3,299,842 | 1/1967 | Bingham | 111/7.2 |
| 3,405,669 | 10/1968 | Nimrick | 111/7.2 |
| 3,755,966 | 9/1973 | Smith | 47/48.5 |
| 3,774,556 | 11/1973 | Poll | 111/7.2 |
| 3,911,837 | 10/1975 | Quick | 111/120 |
| 4,850,291 | 7/1989 | Masuko et al. | 111/7.2 |
| 5,272,992 | 12/1993 | Barbour et al. | |

FOREIGN PATENT DOCUMENTS

| | | | |
|---|---|---|---|
| 108222 | 6/1875 | France | 111/7.2 |
| 157807 | 10/1882 | France | 111/7.2 |
| 340500 | 9/1921 | Germany | 111/7.2 |
| 175728 | 8/1953 | Germany | 111/7.2 |
| 613772 | 12/1960 | Italy | 111/7.2 |
| 4958 | 3/1892 | Switzerland | 111/7.2 |

Primary Examiner—Terry Lee Melius
Assistant Examiner—Christopher J. Novosad

[57] ABSTRACT

A plant feeder apparatus includes a rigid support assembly which includes a top end portion, a mid-portion, and a bottom end portion. The bottom end portion is adapted to penetrate soil to a sufficient depth such that the soil is capable of retaining the support assembly in an upstanding orientation, and the top end portion is adapted to support a chemical dispenser assembly. The chemical dispenser assembly includes a container for containing a quantity of a dissolved chemical. A conduit is connected to the container for conveying a portion of the dissolved chemical out of the container. A manually-operated valve assembly is supported by the container for controlling outflow of dissolved chemical from the container, and a flow conduit assembly is supported by the support assembly and is connected to the conduit for conveying dissolved chemical from the container to the soil. The flow conduit assembly includes a top end portion in fluid communication with the conduit. A mid-portion of the flow conduit assembly is in fluid communication with the top end portion, and a bottom end portion of the flow conduit assembly is in fluid communication with the mid-portion. The bottom end portion of the flow conduit assembly is adapted to be positioned in the soil and includes an outlet aperture from which dissolved chemical can exit into the soil. The support assembly and the flow conduit assembly are formed as a unified integrated rigid pipe assembly.

6 Claims, 1 Drawing Sheet

PLANT FEEDER APPARATUS

BACKGROUND OF THE INVENTION

1. Field of the Invention

The present invention relates generally to devices for feeding plants and, more particularly, to plant feeding devices especially adapted for applying plant food to roots of a plant.

2. Description of the Prior Art

In order to promote healthy growth of plants, plant food or fertilizer is often applied to the plant or the soil in which the plant is growing. There are numerous known methods for applying the plant food. In one method, solid plant food materials are dissolved in water within a hand-carried container, and the solution is poured or sprayed from the hand-carried container onto the plant directly or directly onto the soil in which the plant is rooted. A disadvantage of this method is the need to hand carry the dispensing container to the plant each time the food is dispensed. In this respect, it would be desirable to provide a method for dispensing plant food to a plant which does not require carrying a hand-carried container to the plant each time the plant food is dispensed.

Another method of dispensing plant food involves the placement of a food leaching device in the soil in which the plant is rooted. As long as the soil is wet, plant food leaches out of the soil-placed device and can contact the roots of the plant. This method, however, is highly dependent upon the moisture content of the soil for its optimum utility. In times of drought, such a device may not operate efficiently. On the other 3hand, is a rainy season, too much plant food may be leached out and even wasted. In this respect, it would be desirable if a method of feeding a plant included a soil-placed feeding device that did not depend upon soil moisture content for its efficient operation.

Plants need water in addition to plant food. In this respect, it would be desirable if a plant feeding device provided both plant food and water in a single operation.

Sometimes, when a solid plant food is present in a excessively high concentration, it may burn the plant. On the other hand, if the plant food is sufficiently diluted, it will not burn the plant. In this respect, it would be desirable for a plant feeding device that provided a plant food with sufficient dilution to prevent a plant from being burned by excessively concentrated plant food.

Throughout the years, a number of innovations have been developed relating to plant feeding devices, and the following U.S. patents are representative of some of those innovations: 3,755,966; 3,774,556; 3,911,837; 4,850,291; and 5,272,992. More specifically, U.S. Pat. No. 3,755,966 discloses a deep root feeder and tree irrigator that is installed in the soil adjacent to the roots of a tree. Once the device is installed in the soil, essentially no control for dispensing the food into the soil is possible. In this respect, it would be desirable to provide a device for dispensing plant food into the soil adjacent to the roots of a plant which provided considerable control over the food-dispensing process.

U.S. Pat. No. 3,774,556 discloses a device for introducing liquids into soils which employs a motorized rotary drill and a remote supply of plant food connected to the drill by hoses. To avoid the complexities of a rotary drill and a remote supply of plant food, with the accompanying hoses, it would be desirable if a plant feeding device were provided which does not employ a rotary drill and does not employ a remote :plant food supply connected to a dispenser using hoses.

U.S. Pat. No. 3,911,837 discloses a liquid fertilizer injector that has wheels, a furrow-forming shanks, and a fertilizer-containing tank. As the device is pulled along the ground, the shanks make furrows in the ground into which fertilizer is dispensed. Such a device is useful for preparing the soil for future plan tings. However, such a device is not designed to provide plant food for already planted and growing plants. Moreover, for already planted plants, cutting a furrow adjacent to the plant is not desirable.

U.S. Pat. Nos. 4,850,291 and 5,272,992 disclose wheeled plant food dispensers that include devices for penetrating the ground as the device moves along its wheels. It is clear that such devices are designed to feed a large plurality of plants spaced apart from one another in long rows in rapid succession. However, it would be desirable to provide a plant feeding device that is stationary and dedicated to one or more plants.

Still other features would be desirable in a plant feeder apparatus. For example, it would be desirable to be able to install a plant feeding device in the soil without actually bending down and working at ground level. This could avoid starting or exacerbating back or knee problems.

Different plants have root systems that are located at different underground levels in the soil. In this respect, it would be desirable for a plant feeding device to be adaptable for plants having root systems at different underground levels.

By being able to apply plant food directly to the root regions of the plant, great savings and significantly less waste is obtained in comparison with applying food to the whole plant.

Thus, while the foregoing body of prior art indicates it to be well known to use plant feeding devices, the prior art described above does not teach or suggest a plant feeder apparatus which has the following combination of desirable features: (1) provides a method for dispensing plant food to a plant which does not require carrying a hand-carried container to the plant each time the plant food is dispensed; (2) includes a soil-placed feeding device that does not depend upon soil moisture content for its efficient operation; (3) provides both plant food and water in a single operation; (4) provides a plant food with sufficient dilution to prevent a plant from being burned by excessively concentrated plant food; (5) provides a device for dispensing plant food into the soil adjacent to the roots of a plant which provides considerable control over the food-dispensing process; (6) does not employ a rotary drill and does not employ a remote plant food supply connected to a dispenser using hoses; (7) provides a plant feeding device that is stationary and dedicated to one or more plants; and (8) enables one to install a plant feeding device in the soil without actually bending down and working at ground level. The foregoing desired characteristics are provided by the unique plant feeder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a plant feeder apparatus which includes a rigid support assembly which includes a top end portion, a mid-portion, and a bottom end portion. The bottom end portion is adapted to penetrate soil to a sufficient depth such that the soil is capable of retaining the support assembly in an upstanding orientation, and the top end portion is adapted to support a chemical dispenser assembly. A chemical dispenser assembly is connected to the top end portion of the support assembly. The chemical dispenser assembly includes a container for containing a quantity of a dissolved chemical. A conduit is connected to the container for conveying a portion of the dissolved chemical out of the container. A manually-operated valve assembly is supported by the container for controlling outflow of dissolved chemical from the container, and a flow conduit assembly is supported by the support assembly and is connected to the conduit for conveying dissolved chemical from the container to the soil.

The flow conduit assembly includes a top end portion in fluid communication with the conduit. A mid-portion of the flow conduit assembly is in fluid communication with the top end portion, and a bottom end portion of the flow conduit assembly is in fluid communication with the mid-portion. The bottom end portion of the flow conduit assembly is adapted to be positioned in the soil and includes an outlet aperture from which dissolved chemical can exit into the soil. The support assembly and the flow conduit assembly are formed as a unified integrated rigid pipe assembly.

The manually-operated valve assembly includes a handle assembly which is connected to the container. A trigger assembly is connected to the handle assembly. A pull rod is connected to the trigger assembly, and a ball-shaped valve element is connected to the pull rod. The trigger assembly includes a fulcrum portion connected to the handle assembly; a first lever portion is connected to the fulcrum portion; and a second lever portion is connected to the first lever portion.

The manually-operated valve assembly further includes a spring assembly connected between the handle assembly and the second lever portion of the trigger assembly. The conduit includes a plurality of exit apertures which permit flow of dissolved chemical from the container, through the conduit, and to the flow conduit assembly which conveys the dissolved chemical to the soil.

A lid is connected by a hinge assembly to a ceiling portion of the container. The top end portion of the flow conduit assembly includes a valve surface adapted to engage the ball-shaped valve element of the manually-operated valve assembly for providing a valving action for the conduit.

A point assembly is connected to the bottom end portion of the support assembly. The point assembly is adapted to penetrate the soil when a downward force is exerted on the support assembly toward the point assembly when the point assembly is in contact with the soil.

A transverse strut assembly is connected to the support assembly and projects transversely from the support assembly. The transverse strut assembly is selectively adjustable along the support assembly for controlling the depth with which the bottom end portion of the support assembly penetrates into the soil.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the: art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plant feeder apparatus which has all of the advantages of the prior art and none of the disadvantages.

It is another object of the present invention to provide a new and improved plant feeder apparatus which may be easily and efficiently manufactured and marketed.

It is a further object of the present invention to provide a new and improved plant feeder apparatus which is of durable and reliable construction.

An even further object of the present invention is to provide a new and improved plant feeder apparatus which is susceptible of a low cost of manufacture with regard to both materials and labor, and which accordingly is then susceptible of low prices of sale to the consuming public, thereby making such plant feeder apparatus available to the buying public.

Still yet a further object of the present invention is to provide a new and improved plant feeder apparatus which provides a method for dispensing plant food to a plant which does not require carrying a hand-carried container to the plant each time the plant food is dispensed.

Still another object of the present invention is to provide a new and improved plant feeder apparatus that includes a soil-placed feeding device that does not depend upon soil moisture content for its efficient operation.

Yet another object of the present invention is to provide a new and improved plant feeder apparatus which provides both plant food and water in a single operation.

Even another object of the present invention is to provide a new and improved plant feeder apparatus that provides a plant food with sufficient dilution to prevent a plant from being burned by excessively concentrated plant food.

Still a further object of the: present invention is to provide a new and improved plant feeder apparatus which provides a device for dispensing plant food into the soil adjacent to the roots of a plant which provides considerable control over the food-dispensing process.

Yet another object of the present invention is to provide a new and improved plant feeder apparatus that does not employ a rotary drill and does not employ a remote plant food supply connected to a dispenser using hoses.

Still another object of the present invention is to provide a new and improved plant feeder apparatus which provides a plant feeding device that is stationary and dedicated to one or more plants.

Yet another object of the present invention is to provide a new and improved plant feeder apparatus that enables one to install a plant feeding device in the soil without actually bending down and working at ground level.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
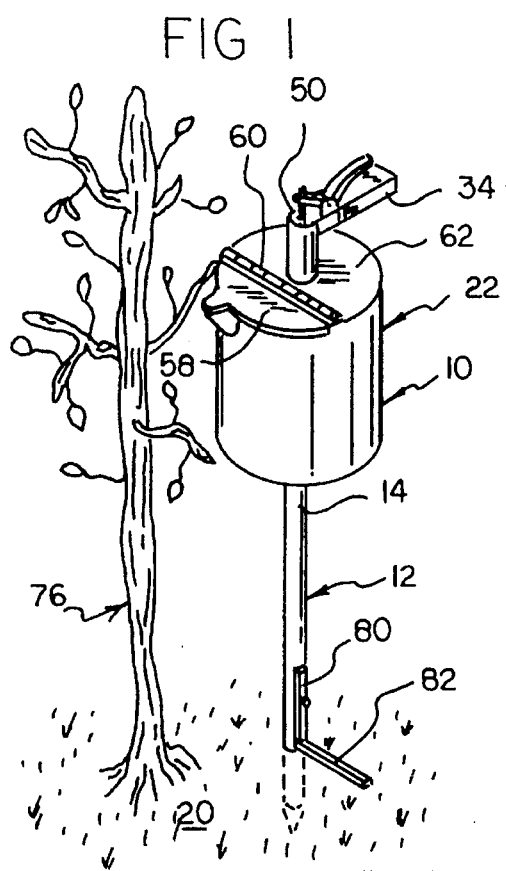
FIG. 1 is a perspective view showing a preferred embodiment of the plant feeder apparatus of the invention installed in soil adjacent to a plant.

With reference to the drawings, a new and improved plant feeder apparatus embodying the principles and concepts of the present invention will be described.

Turning to FIGS. 1-4, there is shown an exemplary embodiment of the plant feeder apparatus of the invention generally designated by reference numeral 10. In its preferred form, plant feeder apparatus 10 includes a rigid support assembly 12 which includes a top end portion 14, a mid-portion 16, and a bottom end portion 18. The bottom end portion 18 is adapted to penetrate soil 20 to a sufficient depth 19 such that the soil 20 is capable of retaining the support assembly 12 in an upstanding orientation, and the top end portion 14 is adapted to support a chemical dispenser assembly 22. A chemical dispenser assembly 22 is connected to the top end portion 14 of the support assembly 12. The chemical dispenser assembly 22 includes a container 24 for containing a quantity of a dissolved chemical 23. A conduit 26 is connected to the container 24 for conveying a portion of the dissolved chemical out of the container 24. A manually-operated valve assembly is supported by the container 24 for controlling outflow of dissolved chemical from the container 24, and a flow conduit assembly 30 is supported by the support assembly 12 and is connected to the conduit 26 for conveying dissolved chemical 23 from the container 24 to the soil 20.

The flow conduit assembly 30 includes a top end portion in fluid communication with the conduit 26. A mid-portion of the flow conduit assembly 30 is in fluid communication with the top end portion, and a bottom end portion of the flow conduit assembly 30 is in fluid communication with the mid-portion. The bottom end portion of the flow conduit assembly 30 is adapted to be positioned in the soil 20 and includes an outlet aperture 78 from which dissolved chemical can exit into the soil 20. As shown in the drawing figures, the support assembly 12 and the flow conduit assembly 30 are formed as a unified integrated rigid pipe assembly.

The manually-operated valve assembly includes a handle assembly 34 which is connected to the container 24. A trigger assembly 36 is connected to the handle assembly 34. A pull rod 40 is connected to the trigger assembly 36, and a ball-shaped valve element 38 is connected to the pull rod 40. The trigger assembly 36 includes a fulcrum portion 44 connected to the handle assembly 34; a first lever portion 46 is connected to the fulcrum portion 44; and a second lever portion 48 is connected to the first lever portion 46.

The manually-operated valve assembly further includes a spring assembly 50 connected between the handle assembly 34 and the second lever portion 48 of the trigger assembly 36. Screws 52 are used to attach one end of the spring assembly 50 to the handle assembly 34. The other end of the spring assembly 50 is attached to a pivoted connection 54 between the second lever portion 48 of the trigger assembly 36 and the pull rod 40. The conduit 26 includes a plurality of exit apertures 64 which permit flow of dissolved chemical from the container 24, through the conduit 26, and to the flow conduit assembly 30 which conveys the dissolved chemical to the soil 20.

A lid 58 is connected by a hinge assembly 60 to a ceiling portion 62 of the container 24. The container 24 also has a floor portion 63. The top end portion of the flow conduit assembly 30 includes a valve surface 42 adapted to engage the ball-shaped valve element 38 of the: manually-operated valve assembly for providing a valving action for the conduit 26. The top end portion of the flow conduit assembly 30 includes outwardly facing threads 74 that engage complementary inwardly facing threads located at the bottom of the container 24.

A point assembly 32 is connected to the bottom end portion 18 of the support assembly 12. The point assembly 32 is adapted to penetrate the soil 20 when a downward force is exerted on the support assembly 12 toward the point assembly 32 when the point assembly 32 is in contact with the soil 20. The point assembly 32 can be made of a hard metal such as steel.

A transverse strut assembly 68 is connected to the support assembly 12 and projects transversely from the support assembly 12. The transverse strut assembly 68 is selectively adjustable along the support assembly 12 for controlling the depth 19 with which the bottom end portion 18 of the support assembly 12 penetrates into the soil 20. A screw 70 is used to attach a portion of the transverse strut assembly 68 to the mid-portion 16 of the support assembly 12. In effect, the transverse strut assembly 68 serves: as a boundary between the mid-portion 16 of the support assembly 12 which is above ground and the bottom end portion 18 of the support assembly 12 which is below ground.

In using the plant feeder apparatus 10 of the invention, a plant 76 is selected, and the plant feeder apparatus 10 of the invention is grasped in a person's hands. A person selects a location on the ground which is expected to have a portion of the root system of the plant 76 in the soil 20 under the surface of the ground. By leaning down on the plant feeder apparatus 10 as the apparatus is held in the person's hands and by twisting the apparatus while leaning on the apparatus, the point assembly 32 penetrates into the soil 20. The extent of penetration into the soil 20 can be estimated by the person, or the transverse strut assembly 68 can be employed to control the depth 19 of penetration into the soil 20. An embodiment of the invention installed in the soil 20 adjacent to a plant 76 is shown in FIG. 1.

The transverse strut assembly 68 is L-shaped and includes a vertical portion 80 and a transverse portion 82. A series of holes or a slot can be provided in the vertical portion 80 of the transverse strut assembly 68 for enabling adjustment of the depth 19 of penetration of the plant feeder apparatus 10 of the invention into the soil 20.

Once the bottom end portion 18 of the support assembly 12 is installed the desired depth 19 into the soil 20, a predetermined quantity of a chemical can be added to the chemical dispenser assembly 22. This is done by lifting the lid 58 and rotating the lid 58 around the hinge assembly 60. A predetermined amount of water can be added to the quantity of chemical to provide a solution containing dissolved chemical. Preferably, the concentration of the dissolved chemical is selected so that the dissolved chemical does not burn the plant 76.

Figure 2:
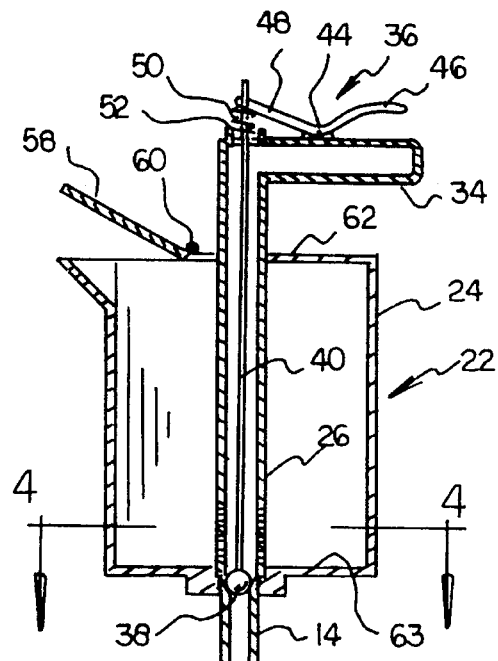
FIG. 2 is an enlarged longitudinal cross-sectional view of the embodiment of the plant feeder apparatus shown in FIG. 1.

As shown in FIG. 2, the plant feeder apparatus 10 of the invention is in a non-feeding mode. More specifically, in the non-feeding mode, the position of the trigger assembly 36, the spring assembly 50, the pull rod 40, and the ball-shaped valve element 38 are inactivated as shown in FIG. 2.

Figure 3:
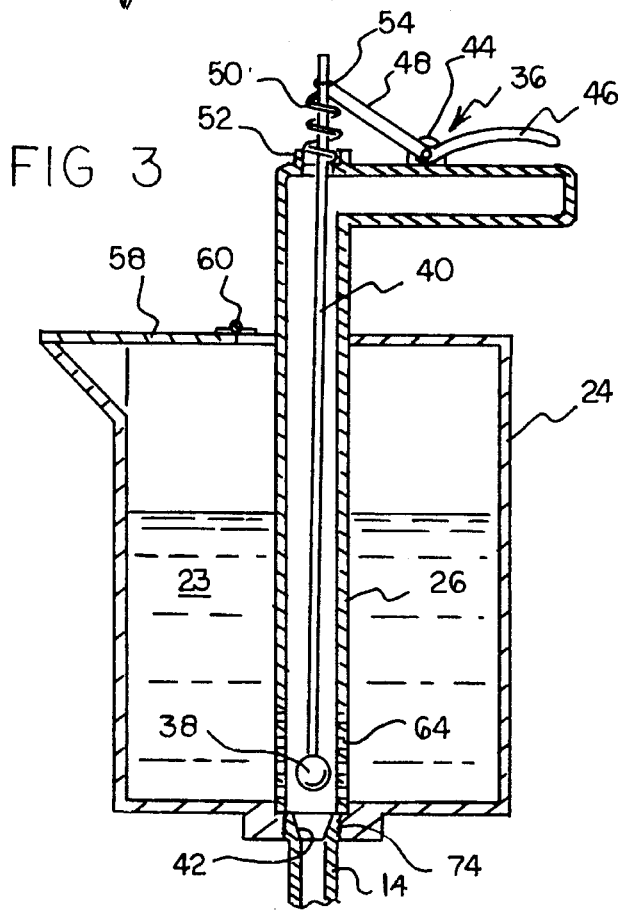
FIG. 3 is an enlarged cross-sectional view of a top portion of the embodiment of the plant feeder apparatus of FIG. 2.
Figure 4:
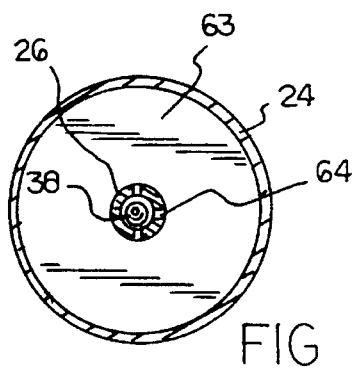
FIG. 4 is a transverse cross-sectional view of the embodiment of the invention shown in FIG. 2 taken along line 4—4 of FIG. 2.

However, to feed dissolved chemical to the plant 76, the plant feeder apparatus 10 is put in a feeding mode as shown in FIG. 3. More specifically, once the chemical is dissolved, the handle assembly 34 can be grasped and the trigger assembly 36 squeezed for a predetermined period of time. More specifically, the first lever portion 46 of the trigger assembly 36 is pressed downward, and the second lever portion 48 of the trigger assembly 36 moves upward, pivoting around the fulcrum portion 44. At the pivoted connection 54, the pull rod 40 is pulled up, causing the ball-shaped valve element 38 to rise above the valve surface 42 on the top end portion of the flow conduit assembly 30. Also, when the second lever portion 48 moves upward, the spring assembly 50 is stretched.

When the ball-shaped valve element 38 is raised off of the valve surface 42. A quantity of the dissolved chemical can flow from the container 24, through exit apertures 64 in the conduit 26, through the flow conduit assembly 30, and out of outlet apertures 78 in the flow conduit assembly 30 and into the soil 20.

Once the squeezing force on the first lever portion 46 is released, the stretched spring assembly 50 causes the ball-shaped valve element 38 to return to the valve surface 42 and causes a cessation of flow of the dissolved chemical from the container 24. The quantity of the dissolved chemical that is dispensed from the chemical dispenser assembly 22 to the soil 20 is determined by a number of factors which include the hydrostatic head in the container 24 and the length of time that the trigger assembly 36 is squeezed.

If it is desired to change the depth 19 at which the dissolved chemical is dispensed into the soil 20, then the screw 70 is loosened, and the vertical portion 80 of the transverse strut assembly 68 is readjusted with respect to the support assembly 12. After a readjustment is made, the screw 70 is retightened. Then, the support assembly 12 can be readjusted so that the transverse portion 82 of the transverse strut assembly 68 rests on the surface of the ground. The plant feeder apparatus 10 of the invention can be used to dispense any of a variety of dissolved chemicals which includes fertilizers, herbicides, and insecticides, among others. That is, in accordance with the invention, the plant feeder apparatus 10 can be used to dispense a variety of dissolved chemicals which may or may not be regarded as plant food.

With the invention, a person can give the trigger assembly 36 a squeeze as often or as seldom as desired. For example, every day the person can give the trigger assembly 36 a squeeze to give the plant 76 a daily dose of a dissolved chemical. Depending upon the stability and the concentration of the dissolved chemical, the chemical dispenser assembly 22 can retain and store a quantity of dissolved chemical that can last an extended period of time. For example, a month's supply of the dissolved chemical can be retained in the container 24. In this way, no fresh dissolved chemical need be added to the chemical dispenser assembly 22 for at least a month.

As shown in the drawing figures, the support assembly 12 and the flow conduit assembly 30 are in the form of a unified integrated rigid pipe. If desired, alternatively and in accordance with the principles of the invention, the support assembly 12 can be made of a solid rod, and the flow conduit assembly 30 can be comprised of a separate tube, which may be flexible.

The components of the plant feeder apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved plant feeder apparatus that is low in cost, relatively simple in design and operation, and which may advantageously be used to dispense plant food to a plant without requiring carrying a hand-carried container to the plant each time the plant food is dispensed. With the invention, a plant feeder apparatus is provided which includes a soil-placed feeding device that does not depend upon soil moisture content for its efficient operation. With the invention, a plant feeder apparatus provides both plant food and water in a single operation. With the invention, a plant feeder apparatus provides a plant food with sufficient dilution to prevent a plant from being burned by excessively concentrated plant food. With the invention, a plant feeder apparatus provides a device for dispensing plant food into the soil adjacent to the roots of a plant which provides considerable control over the food-dispensing process. With the invention, a plant feeder apparatus is provided which does not employ a rotary drill and does not employ a remote plant food supply connected to a dispenser using hoses. With the invention, a plant feeder apparatus provides a plant feeding device that is stationary and dedicated to one or more plants. With the invention, a plant feeder apparatus is provided which enables one to install a plant feeding device in the soil without actually bending down and working at ground level.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A plant feeder apparatus, comprising:

a rigid support assembly which includes a top end portion, a mid-portion, and a bottom end portion, wherein said bottom end portion includes a point assembly which is adapted to penetrate soil to a sufficient depth such that the soil is capable of retaining said support assembly in an upstanding orientation, and wherein said top end portion is adapted to support a chemical dispenser assembly, wherein said point assembly penetrates the soil when a downward force is exerted on said support assembly toward said point assembly when said point assembly is in contact with the soil, a chemical dispenser assembly connected to said top end portion of said support assembly, wherein said chemical dispenser assembly includes a container for containing a quantity of a dissolved chemical, a conduit connected to said container for conveying a portion of the dissolved chemical out of said container, a manually-operated valve assembly supported by said container for controlling outflow of dissolved chemical from said container, a flow conduit assembly supported by said support assembly and connected to said conduit for conveying dissolved chemical from said container to the soil, wherein said flow conduit assembly includes a top end portion in fluid communication with said conduit, a mid-portion in fluid communication with said top end portion, and a bottom end portion in fluid communication with said mid-portion, wherein said bottom end portion of said flow conduit assembly is adapted to be positioned in the soil and includes an outlet aperture from which dissolved chemical can exit into the soil, a transverse strut assembly connected to said support assembly and projecting transversely from said support assembly, wherein said transverse strut assembly is L-shaped and includes a vertical portion and a transverse portion, wherein a slot is provided in said vertical portion of said transverse strut assembly for enabling adjustment of a depth of penetration of said support assembly into the soil, and a fastener for attaching said vertical portion of said transverse strut assembly to a selected position on said mid-portion of said support assembly, such that said transverse strut assembly is selectively adjustable along said mid-portion of said support assembly for controlling a depth with which said bottom end portion of said support assembly penetrates into the soil, wherein said manually-operated valve assembly includes:
      a handle assembly connected to said container,
      a trigger assembly connected to said handle assembly,
      a pull rod connected to said trigger assembly, and
      a ball-shaped valve element connected to said pull rod, and
      wherein said top end portion of said flow conduit assembly includes a valve surface adapted to engage said ball-shaped valve element of said manually-operated valve assembly for providing a valving action for said conduit.

2. The apparatus of claim 1 wherein said support assembly and said flow conduit assembly are formed as a unified integrated rigid pipe assembly.

3. The apparatus of claim 1 wherein said trigger assembly includes:

a fulcrum portion connected to said handle assembly, a first lever portion connected to said fulcrum portion, and a second lever portion connected to said first lever portion.

4. The apparatus of claim 3 wherein said manually-operated valve assembly further includes a spring assembly connected between said handle assembly and said second lever portion of said trigger assembly.

5. The apparatus of claim 1 wherein said conduit includes a plurality of exit apertures which permit flow of dissolved chemical from said container, through said conduit, and to said flow conduit assembly which conveys the dissolved chemical to the soil.

6. The apparatus of claim 1, further including:

a lid connected by a hinge assembly to a ceiling portion of said container.

* * * * *